United States Patent
Eleftheriou

(10) Patent No.: US 8,814,502 B2
(45) Date of Patent: Aug. 26, 2014

(54) DUAL INPUT DRIVE AGB FOR GAS TURBINE ENGINES

(75) Inventor: Andreas Eleftheriou, Woodbridge (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 604 days.

(21) Appl. No.: 13/118,665

(22) Filed: May 31, 2011

(65) Prior Publication Data

US 2012/0308362 A1    Dec. 6, 2012

(51) Int. Cl.
*F01D 15/12*    (2006.01)

(52) U.S. Cl.
USPC ...................................................... 415/122.1

(58) Field of Classification Search
CPC ............. F02C 7/275; F02C 7/32; F01D 15/10
USPC .......................... 416/170 R; 415/124.1, 122.1
See application file for complete search history.

(56) References Cited

U.S. PATENT DOCUMENTS

| | | | |
|---|---|---|---|
| 2,978,869 A | 4/1961 | Hiscock et al. |
| 4,525,995 A | 7/1985 | Clark |
| 4,572,961 A | 2/1986 | Borger |
| 4,708,030 A | 11/1987 | Cordner |
| 4,776,163 A | 10/1988 | Brockmann |
| 4,864,812 A | 9/1989 | Rodgers et al. |
| 6,142,418 A | 11/2000 | Weber et al. |
| 6,561,940 B2 | 5/2003 | Goi et al. |
| 6,735,954 B2 | 5/2004 | MacFarlane et al. |
| 6,838,778 B1 | 1/2005 | Kandil et al. |
| 7,055,330 B2 | 6/2006 | Miller |
| 7,386,983 B2 | 6/2008 | Miller |
| 7,481,062 B2 | 1/2009 | Gaines et al. |
| 7,500,365 B2 | 3/2009 | Suciu et al. |
| 7,543,439 B2 | 6/2009 | Butt et al. |
| 7,552,591 B2 | 6/2009 | Bart et al. |
| 7,690,185 B2 | 4/2010 | Linet et al. |
| 7,805,947 B2 | 10/2010 | Moulebhar |
| 2006/0248900 A1* | 11/2006 | Suciu et al. ..................... 60/802 |
| 2009/0232640 A1 | 9/2009 | Deperrois et al. |
| 2010/0061839 A1* | 3/2010 | Bartolomeo et al. ...... 415/122.1 |

FOREIGN PATENT DOCUMENTS

EP    1980732 A2    10/2008

OTHER PUBLICATIONS

Extended European Search Report dated Sep. 13, 2012 issued by the European Patent Office with respect to Applicant's corresponding European application No. EP 12168745.

* cited by examiner

*Primary Examiner* — Nathaniel Wiehe
*Assistant Examiner* — Kayla McCaffrey
(74) *Attorney, Agent, or Firm* — Norton Rose Fulbright Canada LLP

(57) ABSTRACT

A mechanical drive system of an aircraft gas turbine engine includes a tower shaft operatively connected to first and second shafts in an accessory drive gearbox. The first shaft rotates at a rotational speed lower than the rotational speed of the tower shaft and the second shaft rotates at a rotational speed equal to or higher than the rotational speed of the tower shaft.

19 Claims, 3 Drawing Sheets

DUAL INPUT DRIVE AGB FOR GAS TURBINE ENGINES

TECHNICAL FIELD

The described subject matter relates generally to aircraft gas turbine engines, and more particularly to an improved mechanical drive system of an aircraft gas turbine engine.

BACKGROUND OF THE ART

Gas turbine engines for aircraft typically include an accessory gearbox containing a gear train drivingly connected through a tower shaft to an engine main shaft. Conventional accessory drives always require reducing the input speed which is the rotational speed of the tower shaft, for the starter/generator drive, with subsequent speed reduction for driving the remaining accessories such as the fuel pump, hydraulic pump, oil pump, AC generator, etc. In aircraft gas turbine engines of the new generation, it is desirable to have the starter/generator run at a speed higher than the tower shaft. Therefore, an accessory drive gearbox used in such new engines is required to provide an increased output speed for the new starter/generator and a decreased output speed for the other accessories.

Accordingly, there is a need to provide an improved accessory drive gearbox to meet the requirements for both increased and decreased output speeds.

SUMMARY

In one aspect, the described subject matter provides a mechanical drive system of an aircraft gas turbine engine comprising a tower shaft disposed at a non-zero angle with respect to and operatively connected to a main shaft of the engine and first and second bevel gears mounted on the tower shaft, the tower shaft rotating at a first rotational speed; an accessory drive gearbox including first and second shafts having respective rotational axes, the rotational axes of the first and second shafts in combination with a rotational axis of the tower shaft defining a common plane, a third bevel gear mounted on the first shaft and meshing with the first bevel gear on the tower shaft and a fourth bevel gear mounted on the second shaft and meshing with the second bevel gear on the tower shaft, the first shaft rotating at a second rotational speed and the second shaft rotating at a third rotational speed; wherein the second rotational speed is lower than the first rotational speed and wherein the third rotational speed is equal to or higher than the first rotational speed.

In another aspect, the described subject matter provides an aircraft gas turbine engine comprising at least a main shaft driven by a turbine rotor; a tower shaft disposed at a non-zero angle with respect to and operatively connected to a main shaft of the engine and first and second bevel gears mounted on the tower shaft, the tower shaft rotating at a first rotational speed; an accessory drive gearbox including co-axially disposed first and second shafts, the first and second shafts defining a common rotational axis intersecting a rotational axis of the tower shaft, a third bevel gear mounted on the first shaft and meshing with the first bevel gear on the tower shaft, and a fourth bevel gear mounted on the second shaft and meshing with the second bevel gear on the tower shaft, the first shaft rotating at a second rotational speed lower than the first rotational speed and the second shaft rotating at a third rotational speed higher than the first rotational speed; at least one accessory device driven at a rotational speed lower than the second rotational speed by the first shaft through a pair of spur gears; and an integrated starter generator located outside of and mounted to the accessory drive gearbox, the integrated starter generator being driven by the second shaft at the third rotational speed during engine operation.

Further details of these and other aspects of the described subject matter will be apparent from the detailed description and drawings included below.

BRIEF DESCRIPTION OF THE DRAWINGS

Reference is now made to the accompanying drawings depicting aspects of the described subject matter, in which.

DETAILED DESCRIPTION

Figure 1:
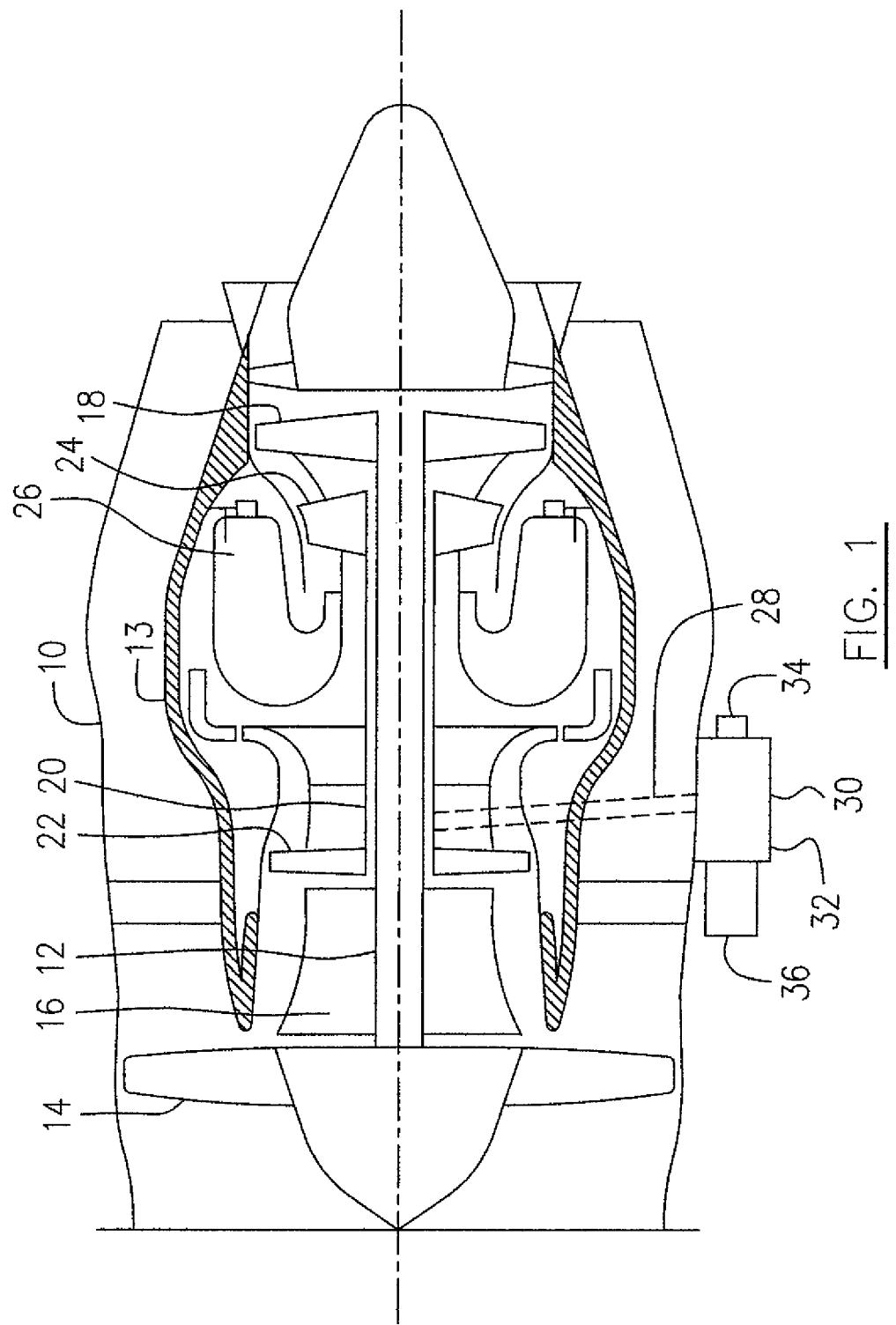
FIG. 1 is a schematic cross-sectional view of a turbofan gas turbine engine as an example illustrating an application of the described subject matter.

FIG. 1 illustrates a gas turbine engine as an example of the application of the described subject matter, which includes a housing or nacelle 10, a core casing 13, a low pressure spool assembly seen generally at 12 which includes a fan assembly 14, a low pressure compressor assembly 16 and a low pressure turbine assembly 18 and a high pressure spool assembly seen generally at 20 which includes a high pressure compressor assembly 22 and a high pressure turbine assembly 24. The core casing 13 surrounds the low and high pressure spool assemblies 12 and 20 in order to define a main fluid path (not numbered) therethrough including a combustor 26.

Figure 2:
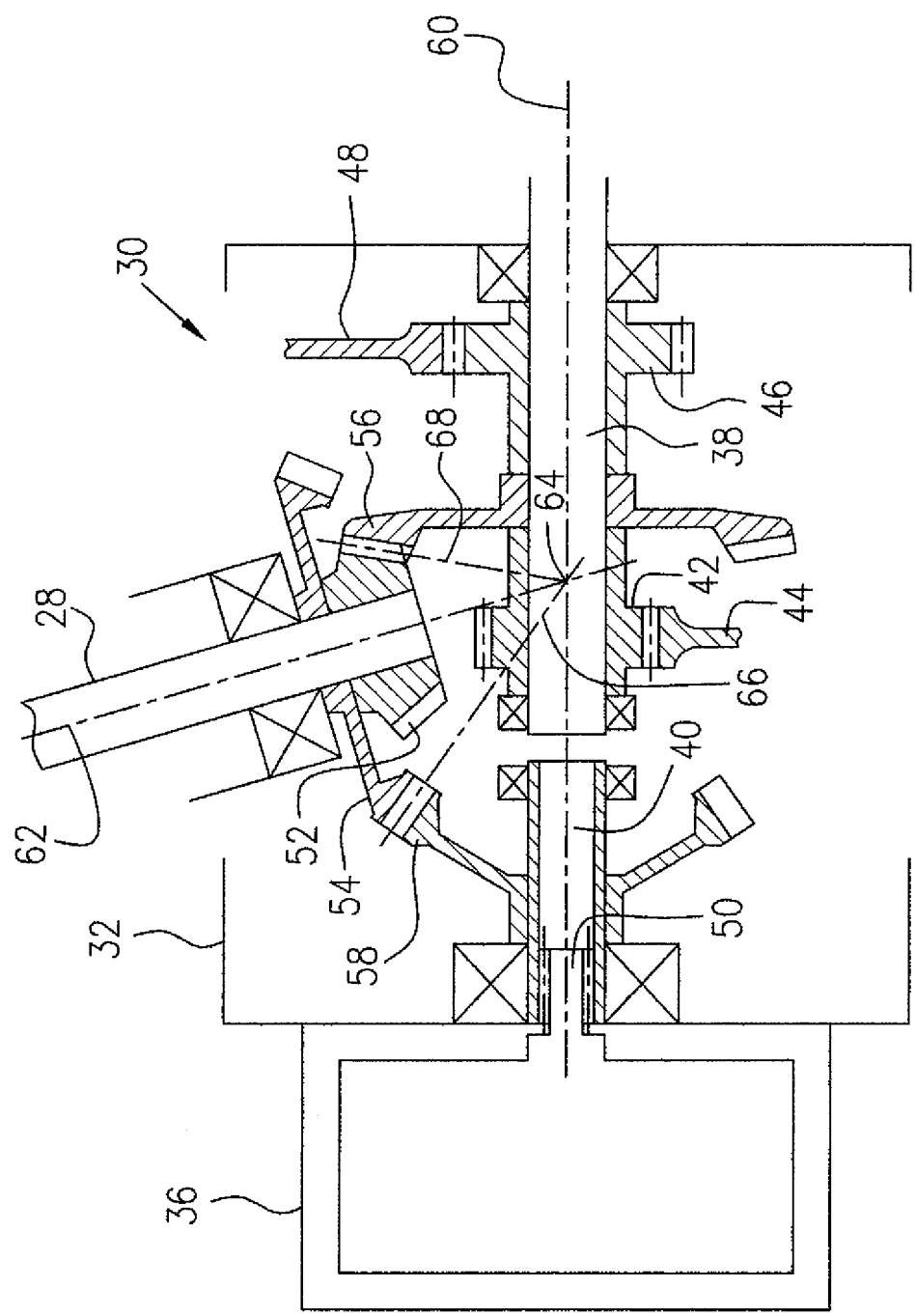
FIG. 2 is a simplified illustration in a cross-sectional view of an accessory drive gearbox according to one embodiment.

Reference is now made to FIGS. 1 and 2. The gas turbine engine further includes an accessory drive gearbox 30 which includes a housing 32 secured to a bottom mounting face (not indicated) of the nacelle 10. A tower shaft 28 which is disposed at a non-zero angle to the co-axial main shafts (not numbered) of the respective low and high pressure spool assemblies 12 and 20, is operatively connected at one end thereof to one of the main shafts, for example of the high pressure spool assembly 20, and is operatively connected at the other end thereof to the accessory drive gearbox 30. The tower shaft 28 and the accessory drive gearbox 30 form a mechanical drive system for transferring engine power to drive an integrated starter generator 36 and one or more other accessory devices indicated by box 34 in FIG. 1, such as a fuel pump, hydraulic pump, etc.

The accessory drive gearbox 30 includes first and second shafts 38, 40 having respective rotational axes in combination with a rotational axis of the tower shaft 28 to define a common plane. For example, the first and second shafts 38 and 40 are disposed co-axially in the accessory gearbox 30, and may be in an end-to-end relationship according to this embodiment, and are supported within the housing 32 by a plurality of bearings (not numbered). The bearings are supported in respective support structures (not shown) of the housing 32. The first shaft 38 is operatively connected to at least one accessory device 34 to drive the at least one accessory device 34 at a relatively low rotational speed. The first shaft 38 is conventionally connected to the at least one accessory device 34 with one or more pairs of spur gears to drive for example a fuel pump, hydraulic pump, oil pump, etc. at a reduced speed.

In the simplified illustration of FIG. 2, only two pairs of spur gears are shown, as an example to illustrate an operative connection to drive (but not to be limited to) a hydraulic pump and a fuel pump (not shown). The first pair of spur gears includes a spur gear 42 mounted on the first shaft 38 for example adjacent to one end thereof which is in the end-to-end relationship with the second shaft 40. The spur gear 42 meshes with a spur gear 44 (only partially shown) which is operatively connected with and is for driving, for example the hydraulic pump. The second pair of spur gears includes a spur gear 46 which is mounted on the first shaft 38 at an axial location relatively distal from the end of the shaft 38 which is in the end-to-end relationship to the second shaft 40. Spur gear 46 meshes with a spur gear 48 (only partially shown) which is operatively connected to and is for driving, for example the fuel pump.

The second shaft 40 is coaxially coupled with a rotor shaft 50 of the integrated starter generator 36 located outside of and mounted on the housing 32 of the accessory drive gearbox 30. The co-axial coupling of the second shaft 40 and the rotor shaft 50 according to this embodiment, is implemented by a pinion (not numbered) formed integrally with the free end of the rotor shaft 50 of the integrated starter generator 36. The second shaft 40 is hollow and includes inner teeth (not numbered) extending radially and inwardly from the tubular wall (not numbered) of the hollow second shaft 40. The pinion formed as the free end of the rotor shaft 50 is inserted into the hollow second shaft 40, meshing with the inner teeth of the shaft as shown in FIG. 2. Therefore the rotor shaft 50 of the integrated starter generator 36 will rotate together with the second shaft 40 at a same rotational speed.

The integrated starter generator 36 requires a rotational speed of, for example 36,000 RPM. This is a relatively high rotational speed with respect to for example 4,000 RPM required by a hydraulic pump or 8,000 RPM required by a fuel pump. The hydraulic pump and the fuel pump are driven by the first shaft 38 through the respective spur gear pairs (42, 44 and 46, 48) which provide respective reduced speed ratios. However, the reduced speed ratios provided by the respective spur gear pairs (42, 44 and 46, 48) are limited, therefore, a dual input drive for the respective first and second shafts 38, 40 of the accessory drive gearbox 30 is desirable such that the first shaft 38 rotates at a speed lower than that of the tower shaft 28 while the second shaft 40 rotates at a speed at least not lower than, and usually higher than that of the tower shaft 28, which is for example 29,000 RPM.

The dual input drive to the accessory drive gearbox 30 according to this embodiment is achieved by two bevel gears 52, 54 mounted on the tower shaft 28 and meshing with respective bevel gears 56, 58 mounted on the respective first and second shafts 38 and 40.

A common rotational axis 60 of the first and second shafts 38, 40 intersects a rotational axis 62 of the tower shaft 28 at a point 64. Middle contact line 66 between the two meshing gears of the respective bevel gears 54, 58 and a middle contact line 68 between the two meshing gears of the respective bevel gears 52, 56 meet at the point 64.

The bevel gear 52 has a diameter and a corresponding number of teeth smaller than a diameter and a corresponding number of teeth of the bevel gear 56, in order to provide a reduced speed ratio of the first shaft 38 to the tower shaft 28, for example between 0.3/1 and 0.5/1, such as about 0.4/1. The pair of bevel gears 52, 56 will therefore provide to the first shaft 38 a rotational speed between 8,700 and 14,500 RPM, such as 11,600 RPM, when the tower shaft 28 rotates at 29,000 RPM.

The bevel gear 54 has a diameter and a corresponding number of teeth larger than a diameter and a corresponding number of teeth of the bevel gear 58, in order to provide an increased speed ratio of the second shaft 40 to the tower shaft 28. The bevel gears 54, 58 may be designed to provide for example, an increased speed ratio such that the rotational speed ratio of the second shaft 40 to the tower shaft 28 is within a range of between 1.0/1 and 1.9/1. For example, a ratio of 36/29 will allow the second shaft 40 to rotate together with the rotor shaft 50 of the integrated starter generator 36 at the speed 36,000 RPM when the tower shaft rotates at 29,000 RPM.

The rotational speed such as 11,600 RPM of the first shaft 38 when transferred to the remaining accessory devices, will be further reduced by the respective spur gear pairs 42, 44 and 46, 48 in order to achieve a desired lower rotational speed such as 4,000 RPM and 8,000 RPM for the respective hydraulic pump and fuel pump drives.

The bevel gear 52 also has a diameter and corresponding number of teeth smaller than the diameter and corresponding number of teeth of the bevel gear 54. The driving bevel gear 52 is mounted on the end of the tower shaft 28 and the driving bevel gear 54 is mounted on the tower shaft 28 adjacent bevel gear 52 in order to provide an appropriate and compact arrangement for meshing with the respective driven bevel gears 56 and 58 which are mounted on the respective first and second shafts 38 and 40. Bevel gear 56 is mounted on the first shaft 38 at an axial location between spur gears 42 and 46 and therefore spur gear 42 is located at an axial location between bevel gears 58 and 56. The spur gear 42 according to this embodiment is a driving gear of the pair gears 42, 44 to provide an output drive speed such as 4,000 RPM which is lower than an output drive speed such as 8,000 RPM provided by the driving spur gear 46 of the paired gears 46, 48. Therefore, spur gear 42 reasonably has a diameter and corresponding number of teeth which are smaller than the diameter and corresponding number of teeth of spur gear 46. The small dimensions of spur gear 42 advantageously fit in the space generally defined by bevel gears 56, 52, 54 and 58. When more spur gears are mounted on the first shaft 38 for driving more accessory devices, spur gear 42 may have a diameter and corresponding number of teeth which are the smallest of those of the remaining driving spur gears mounted on the first shaft 38.

Figure 3:
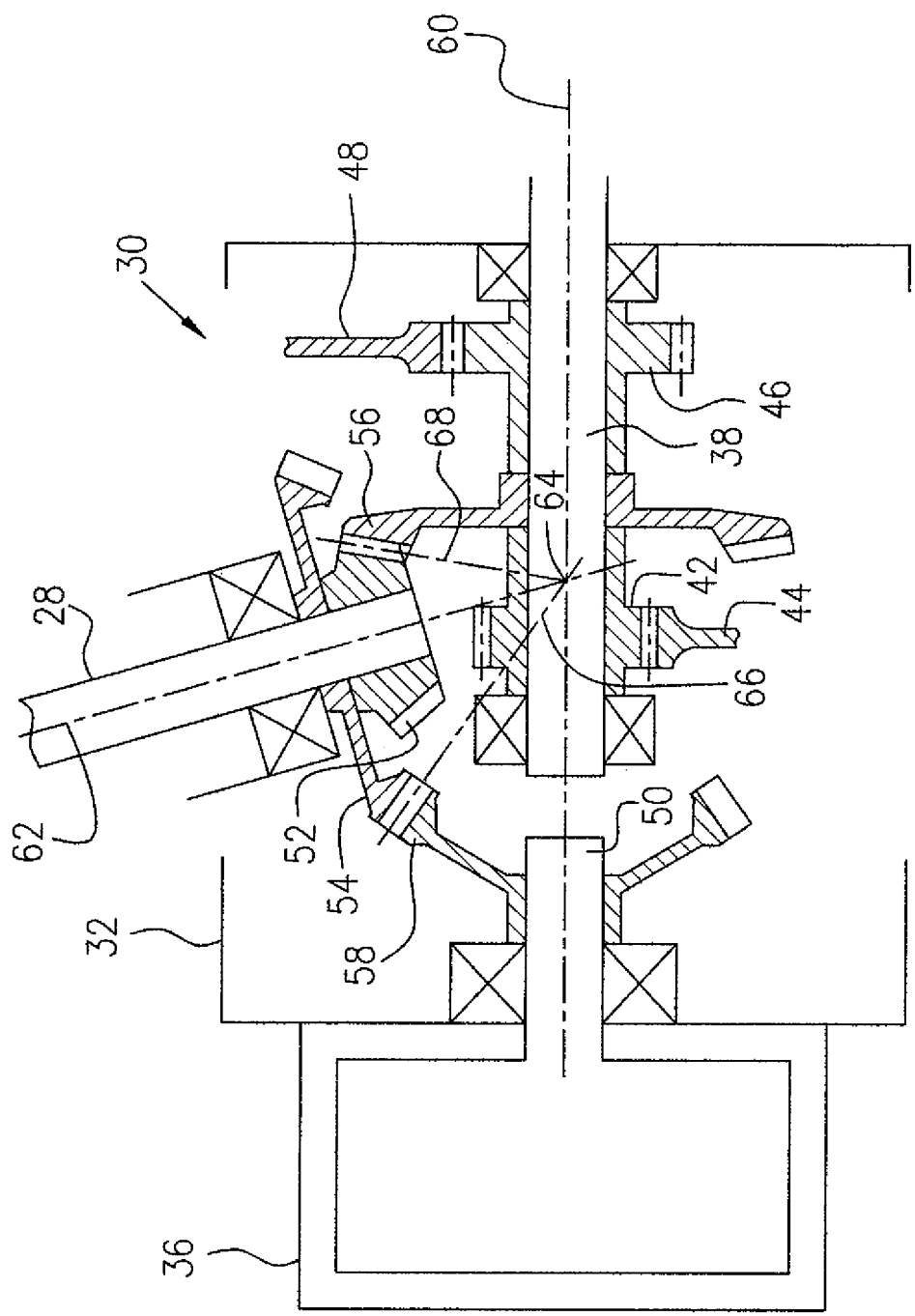
FIG. 3 is a simplified illustration in a cross-sectional view of an accessory drive gearbox according to another embodiment.

FIG. 3 shows another embodiment which is similar to the embodiment in FIG. 2 and similar components and features which are indicated by similar numerical references as those in FIG. 2, will not be redundantly described herein. The difference between the two embodiments lies in that the second shaft 40 in FIG. 2 is replaced by the rotor shaft 50 of the integrated starter generator 36. The co-axial coupling arrangement for the second shaft 40 and the rotor shaft 50 required in the embodiment shown in FIG. 2 is not needed and therefore the structure of the accessory drive gearbox 30 in the embodiment is simpler.

The above description is meant to be exemplary only, and one skilled in the art will recognize that changes may be made to the embodiments described without departure from the scope of the described subject matter. For example, the first and second shafts in the accessory drive gearbox may not be necessarily disposed in a coaxial relationship. The accessory drive gearbox may include more gears, shafts, accessory devices and other components other than those illustrated in the simplified illustration shown in the drawings and described above. The mechanical drive system as described may be applicable to aircraft gas turbine engines other than the exemplary turbofan gas turbine engine illustrated in the drawings and described above. Still other modifications which fall within the scope of the described subject matter will be apparent to those skilled in the art, in light of a review of this disclosure, and such modifications are intended to fall within the appended claims.

The invention claimed is:

1. A mechanical drive system of an aircraft gas turbine engine comprising:
   a tower shaft disposed at a non-zero angle with respect to and operatively connected to a main shaft of the engine and first and second bevel gears mounted on the tower shaft, the tower shaft rotating together with said first and second bevel gears at a first rotational speed;
   an accessory drive gearbox including first and second shafts having respective rotational axes, the rotational axes of the first and second shafts in combination with a rotational axis of the tower shaft defining a common plane, a third bevel gear mounted on the first shaft and meshing with the first bevel gear on the tower shaft, and a fourth bevel gear mounted on the second shaft and meshing with the second bevel gear on the tower shaft, the first shaft rotating at a second rotational speed and the second shaft rotating at a third rotational speed, wherein the second rotational speed is lower than the first rotational speed and wherein the third rotational speed is equal to or higher than the first rotational speed.

2. The system as defined in claim 1 wherein the first and second shafts are co-axially disposed, thereby defining a common rotational axis intersecting the rotational axis of the tower shaft.

3. The system as defined in claim 2 wherein the first and second shafts are disposed in an end-to-end relationship.

4. The system as defined in claim 1 wherein the first bevel gear has a diameter smaller than a diameter of the second bevel gear and the first bevel gear is mounted on one end of the tower shaft.

5. The system as defined in claim 4 wherein the second bevel gear is mounted adjacent the first bevel gear.

6. The system as defined in claim 1 wherein the second shaft is a rotor shaft of an integrated starter generator mounted to the accessory drive gearbox.

7. The system as defined in claim 1 wherein the second shaft is connected to a rotor shaft of an integrated starter generator mounted to the accessory drive gearbox.

8. The system as defined in claim 1 wherein a rotational speed ratio of the second shaft to the tower shaft is within a range of 1.0/1-1.9/1.

9. The system as defined in claim 1 wherein a rotational speed ratio of the second shaft to the tower shaft is 36/29.

10. The system as defined in claim 1 wherein the first shaft is connected by a pair of spur gears to at least one accessory device which requires a rotational speed lower than the second rotational speed.

11. An aircraft gas turbine engine comprising:
    at least a main shaft driven by a turbine rotor;
    a tower shaft disposed at a non-zero angle with respect to and operatively connected to the main shaft and first and second bevel gears mounted on the tower shaft, the tower shaft rotating together with said first and second bevel gears at a first rotational speed;
    an accessory drive gearbox including co-axially disposed first and second shafts, the first and second shafts defining a common rotational axis intersecting a rotational axis of the tower shaft, a third bevel gear mounted on the first shaft and meshing with the first bevel gear on the tower shaft, and a fourth bevel gear mounted on the second shaft and meshing with the second bevel gear on the tower shaft, the first shaft rotating at a second rotational speed lower than the first rotational speed and the second shaft rotating at a third rotational speed higher than the first rotational speed;
    at least one accessory device driven at a rotational speed lower than the second rotational speed by the first shaft through a pair of spur gears; and
    an integrated starter generator located outside of and mounted to the accessory drive gearbox, the integrated starter generator being driven by the second shaft at the third rotational speed during engine operation.

12. The engine as defined in claim 11 wherein the first and second shaft are disposed in an end-to-end relationship.

13. The engine as defined in claim 11 wherein the second shaft is a rotor shaft of the integrated starter generator.

14. The engine as defined in claim 11 wherein the second shaft is co-axially connected to a rotor shaft of the integrated starter generator.

15. The engine as defined in claim 11 wherein the first bevel gear has a diameter smaller than a diameter of the second bevel gear and the first bevel gear is mounted on one end of the tower shaft.

16. The engine as defined in claim 15 wherein the second bevel gear is mounted adjacent the first bevel gear.

17. The engine as defined in claim 12 wherein the first shaft comprises a plurality of spur gears mounted thereon for driving respective accessory devices at a rotational speed lower than the second rotational speed.

18. The engine as defined in claim 17 wherein one of the spur gears is mounted on the first shaft in an axial location between the third and fourth bevel gears.

19. The engine as defined in claim 18 wherein the spur gear located between the third and fourth bevel gears has a diameter smaller than a diameter of the remaining spur gears, respectively.

* * * * *